United States Patent

[11] 3,625,502

[72] Inventor Robert E. Joerres
    Bristol, Conn.
[21] Appl. No. 30,182
[22] Filed Apr. 20, 1970
[45] Patented Dec. 7, 1971
[73] Assignee Associated Spring Corporation
    Bristol, Conn.

[54] POWER SPRING WITH KEEPER AND BRIDLE
    4 Claims, 1 Drawing Fig.

[52] U.S. Cl. .................................................. 267/167
[51] Int. Cl. .................................................. F16f 1/06
[50] Field of Search .................................... 267/156, 167

[56] References Cited
    UNITED STATES PATENTS
    2,833,027 5/1958 Foster .................... 267/156
    3,018,097 1/1962 Johansson ................ 267/156
    FOREIGN PATENTS
    220,791 4/1942 Switzerland ............... 267/156

Primary Examiner—James B. Marbert
Attorney—Scrivener, Parker, Scrivener and Clarke ABSTRACT: A spiral power spring has a keeper comprising an external annular band formed of spring steel having overlapping ends. The outer end of the power spring is reverse bent and the reverse-bent part is positioned between the outer and next inner spring convolutions to form a bridle. The overlapping ends of the keeper, the outer spring convolution and the reverse-bent end part are connected together by a rivet or other connecting means.

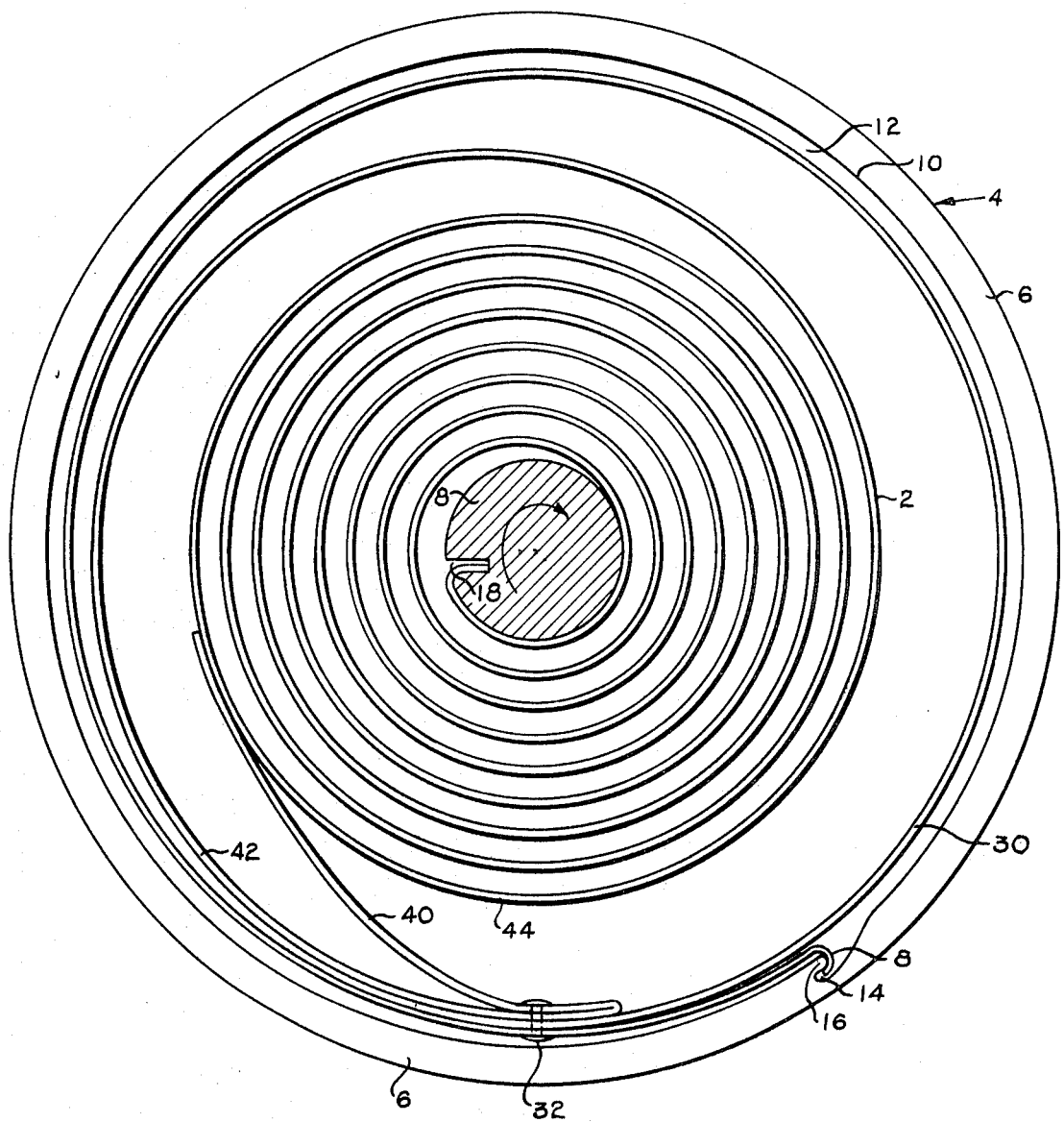

POWER SPRING WITH KEEPER AND BRIDLE

DESCRIPTION OF THE INVENTION

This invention relates to spiral power springs and, more particularly, to the provision of means providing a keeper and a bridle for such springs.

Spiral power springs have many different uses for storing energy and delivering it, and for purposes of description in the specification and claims, all such springs are referred to herein as power springs, without distinction as to their particular use, application or installation.

Such springs are usually enclosed in a rotating barrel with one end connected thereto and the other end connected to an axial post. The barrel may rotate with respect to the post, or the post may rotate with respect to the barrel, and in either case, the initial installation or replacement of such a spring may be time consuming and difficult. If the spring is in an extended or unwound condition it must be coiled to a diameter to permit it to fit into the barrel, and with a heavy-duty power spring this procedure is impractical. Usually, such a spring is wound by a machine to a small diameter at the place where it is manufactured and an annular band or keeper is placed around its outer periphery. While such a keeper facilitates handling during shipment and installation, the keeper constitutes an additional element and the installation of the spring involves transferring it from its keeper to a barrel and attaching the ends of the spring to the relatively movable parts of the device in which it is used. If a heavy-duty power spring escapes from its keeper before or during installation it is a hazard at the time of its escape, and it must be returned to the factory to be rewound and confined.

In modern practice it is well known and almost conventional to use parts of the power spring itself as the keeper, and reference is made to the U.S. Pat. to Clark, No. 1,478,173, and Johansson, No. 3,090,610 for disclosures of keepers of this type.

A wound power spring tends to unwind in asymmetrical loops extending outwardly from one side of the arbor, and this asymmetrical unwinding causes the loops to engage and rub against each other which, in turn, produces excessive friction and binding of the loops of the spring. Such friction and binding produce nonuniform unwinding of the spring and also cause it to deliver energy at a nonuniform rate.

It is now well known to provide means associated with, or forming part of a power spring, to prevent or reduce to a minimum this asymmetrical unwinding. The part or device providing this function is known as a "bridle," and reference is made to the U.S. Pat. to Johansson, No. 2,993,689 and that referred to above for disclosures of different bridle structures and arrangements.

My invention has to do with keepers and bridles for power springs, and provides a new combination of parts providing the functions of both such devices and producing improved spring operation, and which is simple and inexpensive in construction.

DESCRIPTION OF THE DRAWINGS

The single FIGURE of the drawings is a side elevational view of a spring device including a keeper and a bridle according to the present invention.

The single FIGURE of the drawings show a power spring 2 incorporating the novel features of the present invention, installed in a device 4 with which it is used which, for purposes of description, is shown as comprising a barrel 6 mounted to rotate on a fixed central post 8 projecting from a suitable base.

The barrel has an inner annular wall 10 defining a cylindrical recess 12 within which the spring is positioned, and a slot 14 is formed in wall 10 to provide a shoulder 16 to receive a hook 18 formed on the outer end of the keeper, as will be described.

The power spring itself comprises a strip of flexible resilient material such as spring steel, wound in spiral coils and retained in that configuration by a keeper 30 comprising an annular band of preferably the same material as the spring, surrounding the spirally coiled spring with its overlapping ends connected by suitable means which, in the disclosed embodiment, is a rivet 32. This keeper provides its usual function of restraining the spring in its spiral configuration for handling, and is assembled with the spring into the device with which the spring is used, as shown. For this purpose one end of the keeper is provided with the hook 18 for connection to the shoulder 16 of the barrel.

In accordance with the invention a bridle is provided by reverse bending the outer end of the spring to provide an end part 40 lying between the outer convolution 42 and the next inner convolution 44 of the spring and extending preferably less than 90° of arc from the rivet 32. This part 40 provides the conventional function of a bridle, tending to hold the outer coil of the spring against the adjacent inner surface of the keeper band 30 and separating the outer and the next inner spring coils. As the spring is unwound the bridle 40 tends to straighten and form a chord between the outer and the next inner spring coils, thus tending to hold the uncoiling spring symmetrical with respect to center post 8 so that there is free winding movement of the inner end of the spring around the post. Further, the action of the bridle on the outer and next inner coils is transmitted through these coils to the inner coils to resist radial inward movement of the latter. The symmetrical condition then prevents objectionable friction between the adjacent coils of the spring strip. This, in turn, insures that the spring as a whole provides a more uniform torque delivery.

In order to provide a unitary device, a single means is provided by the invention for connecting the overlapped ends of the keeper 30 and the end part and reverse-bent part 40 of the spring, and in the disclosed embodiment of the invention this means is the rivet 32 which passes through the four parts described and is positioned adjacent the reverse bend in the spring, but other means than a rivet may be provided within the scope of the invention.

What is claimed is:

1. A self-contained and self-supporting power spring, comprising a spiral body formed of a strip of flexible resilient material, the outer end part of the strip being reverse bent and the reverse-bent part lying between the outer and the next inner coils and being shaped to separate those coils to provide the function of a bridle.

2. A self-contained and self-supporting power spring, comprising a spiral body formed of a strip of flexible resilient material, the outer end part of the strip being reverse bent and the reverse-bent part lying between the outer and the next inner convolutions and being shaped to separate those coils to provide the function of a bridle, a keeper for the spring comprising an annular band of flexible resilient material surrounding the spiral body and having overlapping ends, and means connecting the overlapping ends of the keeper and the outer end part and reverse-bent part of the spring.

3. A power spring according to claim 2, in which the reverse-bent part extends approximately 90° from the connecting means.

4. A power spring according to claim 2, in which the connecting means is a rivet.

* * * * *